(12) United States Patent
Picard

(10) Patent No.: US 7,339,519 B2
(45) Date of Patent: Mar. 4, 2008

(54) METHODS AND APPARATUS FOR TARGET RADIAL EXTENT DETERMINATION USING DECONVOLUTION

(75) Inventor: Thomas G. Picard, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 301 days.

(21) Appl. No.: 11/178,384

(22) Filed: Jul. 12, 2005

(65) Prior Publication Data

US 2007/0013579 A1   Jan. 18, 2007

(51) Int. Cl.
*G01S 13/00* (2006.01)
(52) U.S. Cl. .................. 342/189; 342/159; 342/196
(58) Field of Classification Search .................. 342/189
See application file for complete search history.

(56) References Cited

U.S. PATENT DOCUMENTS

| | | | |
|---|---|---|---|
| 3,438,032 A | 4/1969 | Cook | |
| 3,715,753 A | 2/1973 | Applebaum et al. | |
| 4,696,568 A | 9/1987 | Weistra | |
| 4,797,923 A * | 1/1989 | Clarke | 704/203 |
| 5,119,100 A | 6/1992 | Marini et al. | |
| 5,486,833 A | 1/1996 | Barret | |
| 5,495,337 A * | 2/1996 | Goshorn et al. | 356/601 |
| 5,945,940 A | 8/1999 | Cuomo | |
| 6,232,912 B1 | 5/2001 | Nagel | |
| 6,650,276 B2 | 11/2003 | Lawless | |
| 2004/0000991 A1 | 1/2004 | Schiffmann et al. | |
| 2004/0140927 A1 | 7/2004 | Meinecke et al. | |
| 2004/0218232 A1 * | 11/2004 | Fishman | 358/486 |
| 2005/0253065 A1 * | 11/2005 | Sengupta et al. | 250/307 |

FOREIGN PATENT DOCUMENTS

| | | |
|---|---|---|
| JP | 4-190106 A | 7/1992 |
| JP | 6-43235 A | 2/1994 |

OTHER PUBLICATIONS

Eric Pigeon et al., Identification of High Speed Targets Facing the Radar According To Their Length And Signature, pp. 417-420.

(Continued)

*Primary Examiner*—Thomas H. Tarcza
*Assistant Examiner*—Matthew M Barker
(74) *Attorney, Agent, or Firm*—Birch, Stewart, Kolasch & Birch, LLP

(57) ABSTRACT

Methods and apparatuses for target radial extent determination using deconvolution are presented. One embodiment features a method for determining a radial extent of an target using an active sensor performing noise reduction on a received signal, deconvolving the noise reduced received signal by a transmit signal to produce a target profile, where both the noise reduced received signal and the transmit signal are over-sampled, and determining the target radial extent using the target profile. Another embodiment further features transforming the digitized transmit signal, transforming the digitized receive signal, thresholding the transformed digitized receive signal, dividing the noise reduced, transformed digitized receive signal by the transformed digitized transmit signal, and inverse transforming the divided signal.

22 Claims, 5 Drawing Sheets

OTHER PUBLICATIONS

Edward J. Rothwell et al., Time Domain Deconvolution of Transient Radar Data, IEEE Transactions on Antennas and Propagation, vol. 38, No. 4, Apr. 1990, pp. 470-475.

N. Iguchi et al., Identification of Transmitting Wave Form for Deconvolution Process, SICE 2002 Aug. 5-7, 2002, Osaka, pp. 1891-1893.

Neelamani, R. et al., ForWaRD: Fourier-wavelet regularized deconvolution ill-conditioned systems, Feb. 2004, on pp. 418-433, vol. 52, Issue: 2.

Rothwell, E. et al., Frequency domain E-pulse synthesis and target discrimination, Apr. 1987, on pp. 426-434, vol. 35, Issue: 4.

Rothwell, E.J. et al., Time domain deconvolution of transient radar data, Apr. 1990, on pp. 470-475, vol. 38, Issue: 4.

Mohamed, N.J. Target signature using nonsinusoidal radar signals, Nov. 1993, on pp. 457-465, vol. 35, Issue: 4.

Pigeon, E. et al., Identification of high speed targets facing the radar according to their length and signature, Sep. 25-28, 1994, on pp. 417-420 vol. 2.

Bose, R. et al., Sequence CLEAN: a modified deconvolution technique microwave images of contiguous targets, Jan. 2002, on pp. 89-97, vol. 38, Issue: 1.

Iguchi, N. Identification of transmitting wave form for deconvolution process. A study on high resolution microwave subsurface radar image. 1, Aug. 5-7, 2002, on pp. 1891-1893, vol. 3.

Chang, E. Image deconvolution techniques for extending the coverage rate of synthetic aperture sonar, Sep. 22-26, 2003, on p. 2445 vol. 5.

* cited by examiner

METHODS AND APPARATUS FOR TARGET RADIAL EXTENT DETERMINATION USING DECONVOLUTION

BACKGROUND OF THE INVENTION

Embodiments of the present invention generally relate to the determining information about targets using signals produced by a sensor system, and more specifically, obtaining target dimensions having extents which are smaller that the collected resolution supported by the bandwidth of the sensor system, using deconvolution techniques.

Conventional sensor systems theory states that the degree to which a target can be resolved in the direction of signal propagation is typically dependent upon the bandwidth of the sensor system. The direction of signal propagation is hereinafter referred to as the range direction. The smallest dimension that can be resolved in range can be referred to as the range resolution. In one example, when the sensor system is a radar system, a radar receiver can perceive the target as a collection of resolution cells. Each resolution cell can be thought of as a discrete unit of area having a size dependent upon the range resolution. As the resolution cell becomes finer (i.e., smaller), greater detail can be derived from the radar returns received from a target.

FIG. 1 is an idealized diagram illustrating the relationship between bandwidth and range resolution for an exemplary radar system. A radar 102 transmits a transmit signal $x_T(t)$. In this example, $x_T(t)$ presented as a signal having a simple pulse waveform for ease of explanation; however, one of ordinary skill in the art would appreciate these concepts hold true for waveforms using any known modulation type and/or coding. For simple pulses, the bandwidth of the pulse signal, BW (typically measured in Hz), is inversely proportional to the pulse length τ (typically measured in sec). Additionally, while only one pulse is shown for ease of explanation, a plurality of transmit pulses can be sequentially transmitted at a periodic rate known as the Pulse Repetition Frequency (PRF). Once transmitted from radar 102, transmit signal $x_T(t)$ propagates through space until it strikes a target 104. Target 104 is illustrated as having three major facets (or reflectors) separated in the range direction, each of which reflect some portion of energy supplied by transmit signal $x_T(t)$ back toward radar 102. Radar 102 is configured to receive the three reflected pulses, which are designated as receive signals $x_{R1}(t)$, $x_{R2}(t)$, and $x_{R3}(t)$. Each received signal $x_{R1}(t)$, $x_{R2}(t)$, and $x_{R3}(t)$ is received by radar 102 at different times. The time of reception depends upon the distance between each feature of target 104 and radar 102.

Further referring to FIG. 1, two graphs are illustrated depicting transmit signal $x_T(t)$ and receive signals $x_{R1}(t)$, $x_{R2}(t)$, and $x_{R3}(t)$ for transmit pulses having different bandwidths. The vertical axes represent amplitude and the horizontal axes represent time. A first graph 106 represents a scenario where the transmit signal $x1_T(t)$ has a narrow pulse width $\tau_N$, and therefore a corresponding wide bandwidth. Receive signals $x1_{R1}(t)$, $x1_{R2}(t)$, and $x1_{R3}(t)$, each also having a narrow pulse width, are distinct and can be easily distinguished by radar 102. Using a transmit signal having pulse width $\tau_N$, the three features on target 104 can be separately resolved and separate measurements can be performed with respect to each feature. Therefore, the transmitted signal having the narrow pulse width can resolve smaller features in range, and thus afford radar 102 with a finer range resolution.

In contrast, second graph 108 depicts a scenario where a transmit signal $x2_T(t)$ has a wide pulse width $\tau_W$, thus having a narrow bandwidth. Receive signals $x2_{R1}(t)$, $x2_{R2}(t)$, and $x2_{R3}(t)$, each also having a wide pulse width, overlap each other to some degree and are indistinguishable by radar 102. As a result, the three features on target 104 can not be separately resolved, so the amount of information radar 102 can extract regarding target 104 is reduced from that in the wide bandwidth case. Because of the coarser resolution of the received signals $x2_{R1}(t)$, $x2_{R2}(t)$, and $x2_{R3}(t)$, separate measurements based upon the three range features of object 104 can not be performed, and the amount of information which can be extracted using the low bandwidth receive pulses can be reduced.

From the two scenarios described above in FIG. 1, it is clear that the amount of bandwidth used in the transmitted signal can be a limiting factor in a radar system's resolution, and hence can limit the information that can be derived regarding the target. Sophisticated signal processing techniques have been established in an attempt to work around bandwidth limitations, such as, for example, bandwidth extrapolation processing and/or modeling techniques such as Multiple Signal Classification (MUSIC). However, these methods can be computationally intensive and may not be suitable in situations where execution time is critical and solutions need to be determined quickly. Moreover, many of these techniques may make assumptions about the underlying structure of the radar signal, or make other simplifying assumptions, that could limit the accuracy of the measurements derived from the received radar signals.

SUMMARY OF THE INVENTION

Accordingly, embodiments of the present invention are directed to determining target radial extents using deconvolution which substantially overcome and/or obviate issues associated with the related art. These embodiments can feature the ability to operate in a relatively quick and simple manner to determine the target radial extent (or range extent). Moreover, these embodiments can also feature the ability to obtain target radial extents which are independent of the transmitted bandwidth and the type of waveform used as the transmitted signal.

In one embodiment consistent with the invention, a method for determining a radial extent of a target using radar signals is presented. The method features super-sampling a transmitted radar signal to generate a digitized transmit signal, super-sampling received radar signals to generate a digitized receive signal, reducing noise present in the digitized receive signal, deconvolving the noise reduced digitized receive signal and the digitized transmit signal to compute a spatial profile, and generating the target radial extent using the spatial profile.

In another embodiment of the invention, the method for determining the radial extent further provides transforming the digitized transmit signal, transforming the digitized receive signal, thresholding the transformed digitized receive signal, dividing the noise reduced, transformed digitized receive signal by the transformed digitized transmit signal, and inverse transforming the divided signal.

In yet another embodiment consistent with the invention, an apparatus for determining a radial extent of a target using radar signals is presented. The apparatus features an analog-to-digital converter (A/D) which performs super-sampling, at least one processor functionally coupled to the A/D, and memory functionally coupled to the processor, wherein the memory stores a super-sampled digitized transmit signal and a super-sampled digitized receive signal, and further stores instructions causing the processor to reduce noise present in the digitized receive signal, deconvolve the digitized receive signal and the digitized transmit signal to compute a spatial profile, and generate the target radial extent using the spatial profile.

In yet another embodiment consistent with the invention, a method for determining a radial extent of an target using an active sensor is presented. The method features performing noise reduction on a received signal, deconvolving the noise reduced received signal by a transmit signal to produce a target profile, wherein both the noise reduced received signal and the transmit signal are over-sampled, and determining the target radial extent using the target profile.

Additional features of embodiments of the invention will be set forth in the description which follows, and in part will be apparent from the description, or may be learned by practice of the invention.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
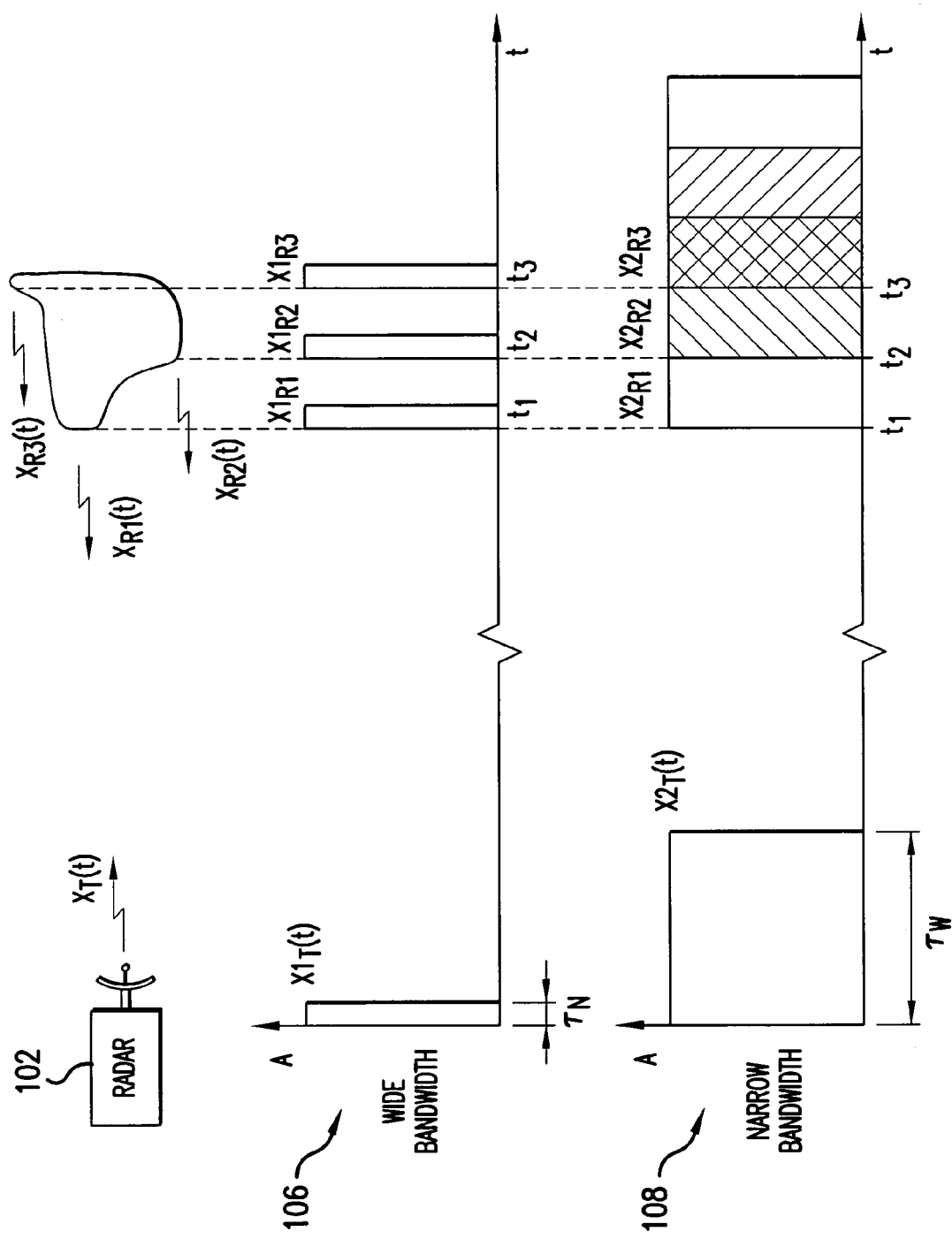
FIG. 1 shows an exemplary diagram illustrating the relationship between bandwidth and the ability to resolve the features of a target.
Figure 2:
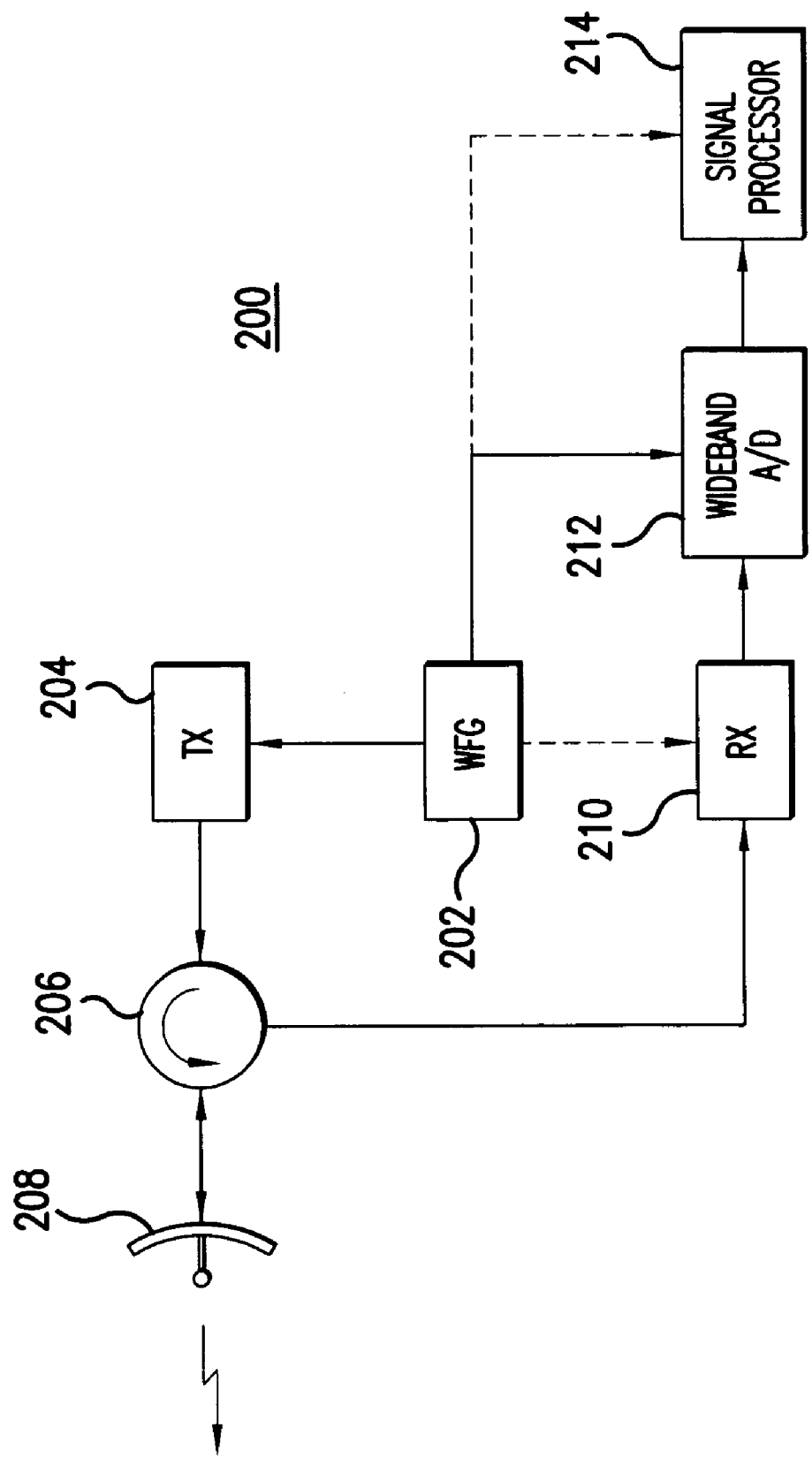
FIG. 2 depicts a top-level system diagram illustrating an exemplary radar system consistent with an embodiment of the invention.

FIG. 2 depicts an top-level system diagram illustrating an exemplary radar system 200 consistent with an embodiment of the invention. The system diagram presented here is simplified for ease of explanation. Radar system 200 can be any type of radar system known one of ordinary skill in the art, which could include, for example, surveillance radars, imaging radars, multi-function fire control radars, etc. While radar systems are described herein, those skilled the art will appreciated that other forms of electromagnetic systems, e.g. infrared etc, can benefit from the present invention. Radar system 200 can also be used in conjunction with additional radar systems known in the art. The radar system 200 includes a waveform generator (WFG) 202, a transmitter 204, a circulator 206, an antenna 208, a receiver 210, a wideband analog-to-digital converter (A/D) 212, and a signal processor 214.

WFG 202 generates a transmit waveform. The transmit waveform can be generated using either analog or digital synthesis. WFG 202 can generate waveforms using any structure, modulation and/or coding known in the art, including, for example, pulse, chirp, sinusoidal, etc. The transmit waveform could also have any known radar bandwidths, such as, for example, 50-100 MHz; and known center frequencies, such as, for example, 2 GHz. Once the transmit waveform is generated, WFG 202 can supply the transmit waveform to transmitter 204. Transmitter 204 can amplify the transmit waveform to produce a transmit signal. This amplification can provide the transmit signal with enough power so that signals received by radar system 200 have sufficient signal-to-noise ratio. Optionally, WFG 202 can also supply the transmit waveform to receiver 210, in the event radar system 200 demodulates the received signal using a replica of the transmit waveform, such as, for example, in the manner of a de-chirped radar system.

Transmitter 204 can then pass the transmit signal through circulator 206 to antenna 208. The transmit signal can then radiate from antenna 208, which can provide direction and gain to the transmit signal, and subsequently propagate through space until it reaches one or more targets. Each target receiving energy from the transmit signal can reflect a portion of that energy back toward antenna 208 in the form of received signals.

The received signals can mathematically modeled as the convolution of the transmit waveform with the spatial response of the target. Through linear systems theory, it is known that the Fourier Transform of a convolution operation of two time signals is equivalent to the multiplication of the Fourier Transform pair of the individual time signals. Using continuous time representations, the Fourier Transform of the received signals can be mathematically represented as:

$$\int_{-\infty}^{\infty} [x_T(t) * \sigma(r, \theta, \phi)] e^{j\omega t} dt = \int_{-\infty}^{\infty} x_T(t) e^{j\omega t} dt \cdot \int_{-\infty}^{\infty} \sigma(r, \theta, \phi) e^{j\omega t} dt$$

where,
$x_T(t)$ is the transmit waveform generated by WFG 202;
$\sigma(r,\theta,\phi)$ is a spatial profile of the target;
$e^{j\omega t}$ is the kernel of the Fourier Transform; and
* denotes the convolution operator.

Further referring to FIG. 2, The signals received by antenna 208 are directed to circulator 206, which routes the signals down to receiver 210. Receiver 210 can filter and range gate the received signals. Range gating selects a portion of signals to be received from a particular range and range swath by windowing the received signals using an window function having an appropriate extent and time delay. Receiver 210 can also frequency demodulate the signals after filtering and range gating. Optionally, receiver 210 can demodulate the received signals with a replica of the transmit waveform supplied by waveform generator 202. This can be done in radar systems which perform de-chirping which can be used in pulse compression processing.

Further referring to FIG. 2, receiver 210 then directs the received signals to wideband A/D 212 to convert the received signals into a digital form which can be processed using digital techniques. Wideband A/D 212 highly over-samples the received signals using a sampling frequency which is at least an order of magnitude greater than the bandwidth. For example, wideband A/D can use oversample ratios greater than or equal to 20:1. Performing A/D conversing using the oversampling ratios as described above is referred to herein as super-sampling. Wideband A/D converter 212 can also receive the transmit waveform so it can be digitized for later use by signal processor 214. After A/D conversion, the digitized received signal and digitized transmit waveform can then be directed to signal processor 214. Alternatively, if the transmit waveform is generated using digital synthesis, WFG 202 can supply the transmit waveform directly to signal processor 214 in a digital format. In this case, the transmit waveform can be super-sampled either by WFG 202 or in software by signal processor 214.

Signal processor 214 can perform mathematical operations on digitized signals to extract information from one or more targets. Consistent with this embodiment of the invention, information concerning the spatial profile of the target, $\sigma(r,\theta,\phi)$, may be desired. By manipulating the mathematical relationship presented above, the spatial profile of the target can be obtained by dividing the Fourier Transform of the received signals by the Fourier Transform of the transmit waveform and then performing an inverse Fourier Transform on the quotient. Again, from using linear systems theory, this operation can be represented as the deconvolution of the transmit waveform and the received signals. Using continuous time representations to simplify the notation, this can mathematically represented by:

$$\sigma(r, \theta, \phi) = \int_{-\infty}^{\infty} \left[ \frac{\int_{-\infty}^{\infty} [x_T(t) * \sigma(r, \theta, \phi)] e^{j\omega t} dt}{\int_{-\infty}^{\infty} x_T(t) e^{j\omega t} dt} \right] e^{-j\omega t} d\omega$$

Once the spatial profile of the target is obtained, measurements concerning the target can be performed. For example, the radial extent of the target can be determined by analyzing the positions of the first and last scatterer in the range dimension.

Further referring to FIG. 2, signal processor 214 can perform deconvolution of the super-sampled transmit waveform and receive signals to obtain the spatial profile of the target. Using the spatial profile, signal processor 214 also performs subsequent calculations to determine the radial extent of the target. As used herein, radial extent of a target means that dimension of the target measured as the transmitted signal propagates radially outward from the transmitter 204. Alternatively, other measurements can also be made using the spatial profile to ascertain additional attributes of the target.

While the explanation for radar system 200 presented above was only presented in the context of a single transmit signal, one of ordinary skill in the art would appreciate that multiple transmit signals can used in practice, whereby a series of signals are transmitted and received at a periodic rate based upon the PRF. As it will be explained in more detail below, the invention can be practiced using either using only a single pulse, or using multiple transmit signals.

Radar system 200 can be utilized in a variety of different applications. One application can be for a surveillance radar (SR) which can operate in the Ultra High Frequency (UHF) bands. The SR resolves and discriminates artillery targets, which are less than 1 meter in radial extent, from ballistic re-entry vehicles, which are greater than two meters in radial extent. Using conventional techniques, the SR does not have the bandwidth to resolve targets less than a meter in radial extent. However, embodiments of the invention permit the determination of target radial extent to these dimensions because they are not dependent upon transmitted signal bandwidth. Moreover, the SR does not have the time for many multiple interrogations of a target, so the discrimination process provided by embodiments of the invention permit a quick and accurate estimation of a target radial extent which does not require many receive signals. Other applications of embodiments of the invention can include Federal Aviation Administration (FAA) air traffic control radar to discriminate aircraft type based upon radial extent determination.

One of ordinary skill in the art would appreciate that the invention is not limited to radar systems, and that any type of active sensor system can be consistent with the invention, which could include, for example, sonar systems, laser ranging sensors, etc. As used herein, an active sensor is one which provides the energy which is used to illuminate, irradiate, or otherwise energize the targets which are to be sensed.

Figure 3:
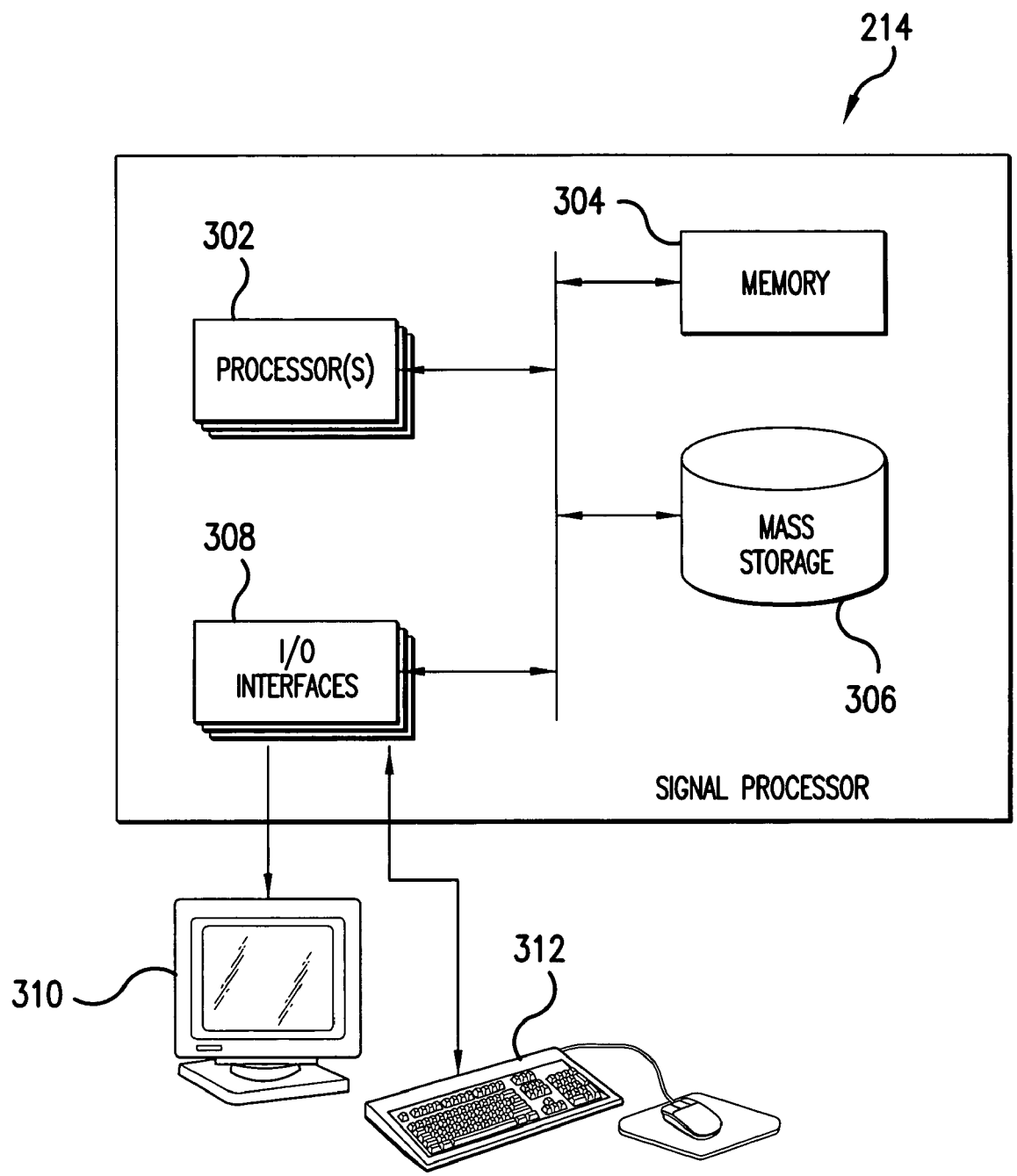
FIG. 3 illustrates a block diagram of an exemplary signal processor consistent with an embodiment of the invention.

FIG. 3 illustrates a block diagram of an exemplary signal processor consistent with an embodiment of the invention. Signal processor 214 can include: at least one processor 302, a memory 304, a mass storage 306, I/O interfaces 308, output display 310, and a user interface 312. Note that signal processor 214 can be any data processing equipment known to one of ordinary skill in the art, such as, for example, workstations, personal computers, special purpose computational hardware, special purpose digital signal processors, and/or embedded processors. Signal processor 214 can execute instructions and perform calculations using at least one processor 302. Program instructions for performing deconvolution, target radial extent determination, and/or any other signal processing can be stored wholly or partially in memory 304, and transferred to processor 302 over a data bus. Mass storage 306 can also store program instructions and the digitized transmit waveform, if it does not change from pulse to pulse, and communicate to processor 302 over the data bus. Mass storage 306 can also contain other various parameters associated with radar system 102 to perform target radial extent determination. Processing system 214 can communicate to other devices in radar system 200, such as, for example, when receiving the digitized transmit waveform and digitized receive signal from wideband A/D 212, through I/O interface 308. Alternatively, signal processor can communicate with other entities over a network and/or over known communication interfaces through I/O interfaces 308. Processing system can provide and receive other information through I/O interface 308, to provide information to users on display 310, and receive user commands and/or data through user interface 312.

Figure 4:
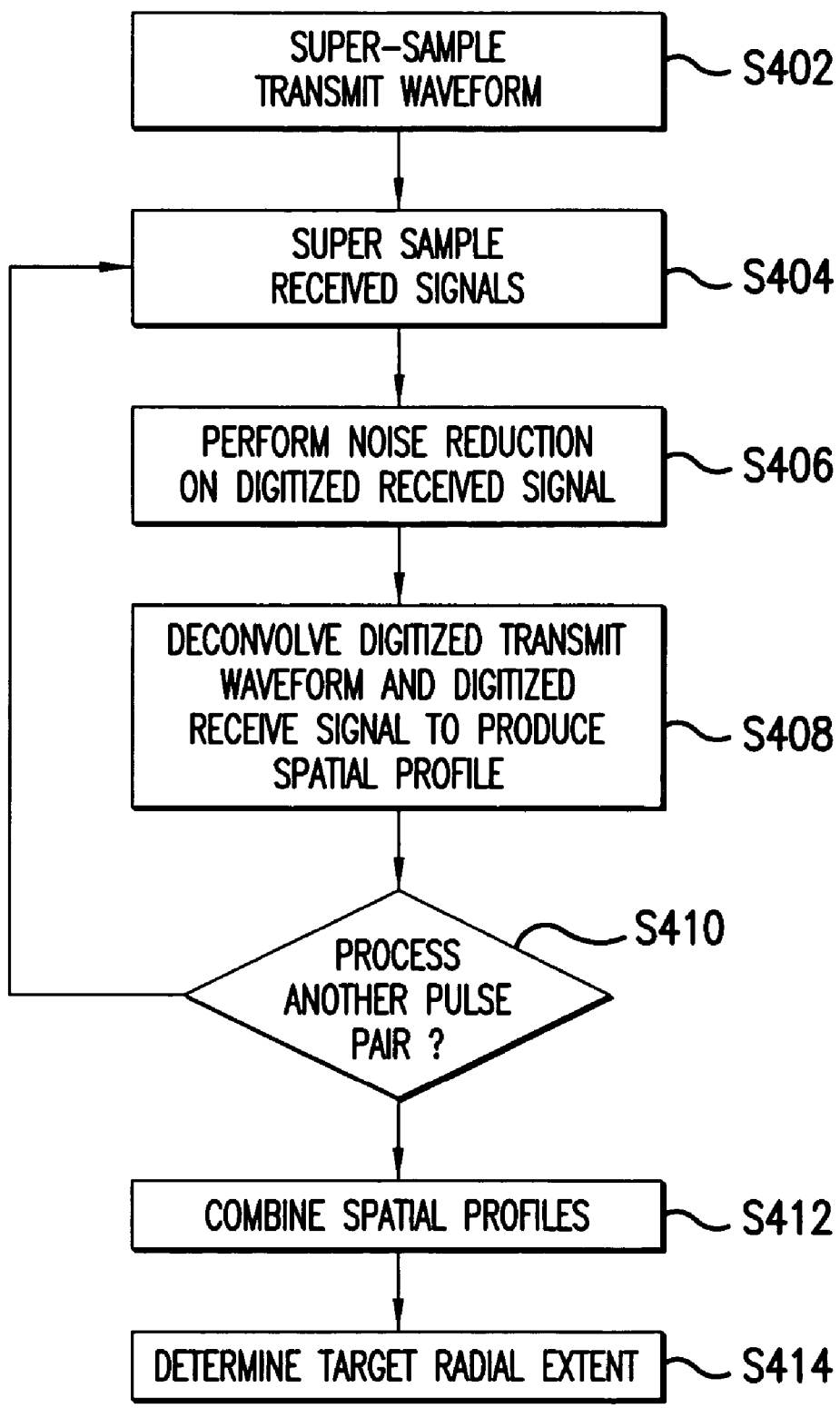
FIG. 4 depicts a flowchart of an exemplary target radial extent determination process consistent with an embodiment of the invention.

FIG. 4 depicts a flowchart of an exemplary target radial extent determination process consistent with an embodiment of the invention. Initially, the transmit waveform can be super-sampled by wideband A/D 212 and stored as a digitized transmit waveform, either in memory 304 or mass storage 306. If the transmit waveform characteristics do not change from pulse to pulse (S402), this can only be performed for one pulse. Alternatively, the transmit waveform can be digitally provided to signal processor 214 directly by WFG 202, either in a super-sampled form, or in a form where the processor performs super-sampling of the transmit waveform using upsampling techniques known in the art. The receive signals can then also be super-sampled by wideband A/D 212 and stored in memory 304 and/or mass storage 306 as a digitized receive signal (S404). The digitized receive signal can then undergo noise reduction processing (S406). If the noise reduction processing is performed in the time domain, any time domain filtering method known to one of ordinary skill in the art can be used, such as, for example, finite impulse response filtering, infinite impulse response filtering, statistical filtering, or non-linear filtering. If the noise reduction is performed in the frequency domain, the transform of the super-sampled receive signals can be simply thresholded. Frequency domain-processing is discussed in more detail below for the explanation of FIG. 5.

Further referring to FIG. 4, after noise reduction processing, the digitized received signal is deconvolved by the digitized transmit waveform to produce the spatial profile of the target (S408). The deconvolution can be performed either in the time domain or in the frequency domain. The frequency domain techniques can be advantages in terms of execution speed, and can be performed using, for example, fast transform techniques (as discussed below in FIG. 5). Moreover, other transform techniques known in the art can be used instead of frequency domain techniques. In the time domain, any techniques know to one of ordinary skill in the art can be used to perform the time domain deconvolution, such as, for example, polynomial division, singular value decomposition techniques, etc.

While embodiments of the invention can determine the radial extent of the target only using one pulse, the accuracy of the determination can be improved if multiple transmit/receive signal pairs are processed. A determination can be made in S410 to process more than one pulse, and steps S404 through S408 could be repeated for each pulse pair processed. Note that if the transmit waveform varied from pulse to pulse, it step S402 can also be repeated for each pulse pair processed (not shown). Once all of the pulse pairs are processed and multiple spatial profiles are computed, the spatial profiles can be combined to reduce noise. This combination can include simple averaging of the spatial profile values, or include other combination techniques known in the art to enhance signal quality over noise (S412). If only one pulse pair is processed, no combination would need to take place.

Once the spatial profile is determined, or in the case of multiple pulse pairs, a combined spatial profile is determined, analysis can be performed to determine the radial extent of the target. This can include of determining the locations of the peaks of the spatial profile in range, and selecting the sample numbers corresponding to the first and last peak. The locations of the peaks can be determined by any peak detector known in the art. By converting the sample numbers to distance, which can be done knowing the parameters of the radar and the oversampling factors, the extent of the target can be estimated to determine its radial extent (S414).

It should be noted that the method can be quite robust with regard to signal to noise ratio, and accurate radial extent estimates can be determined on the basis of only one pulse. It has been experimentally determined that the process can work for individual point scatterers having signal to noise ratios as low as 3 dB, with total signal to noise ratio of the aggregate points scatterers of the target being as low as 12 dB.

Figure 5:
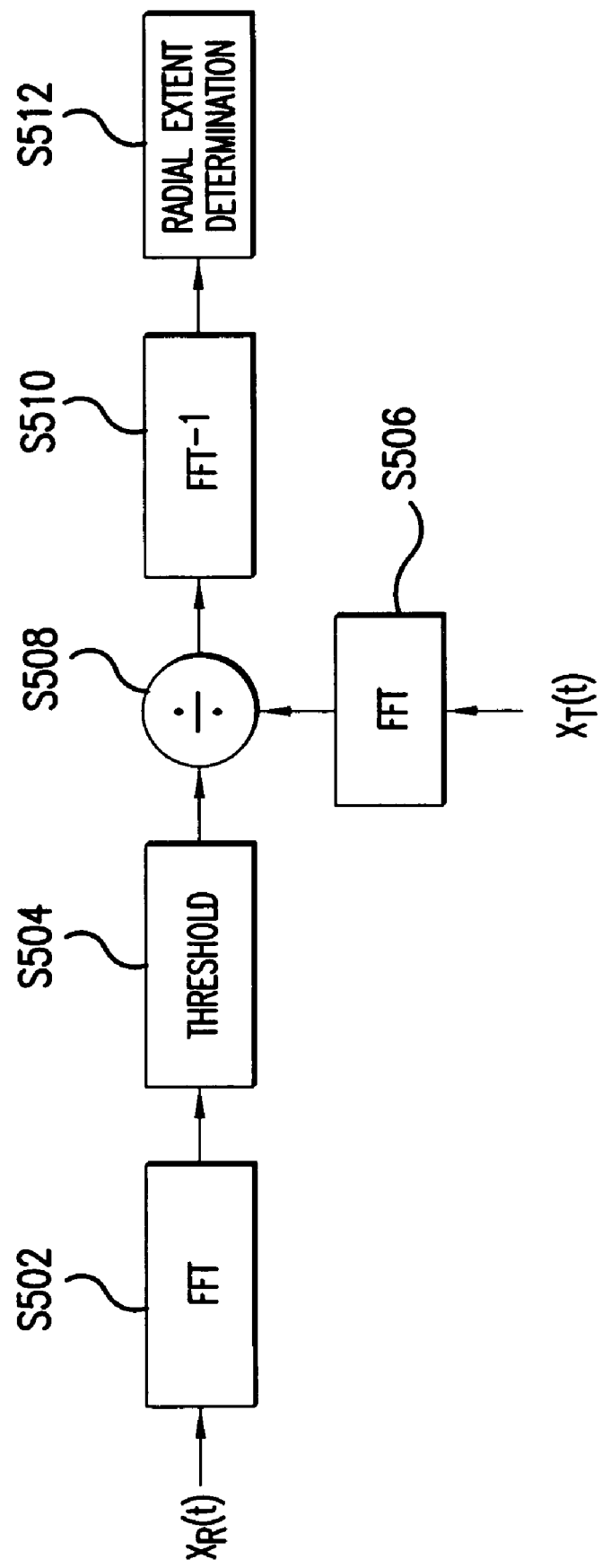
FIG. 5 shows an example of signal flow diagram illustrating signal processing operations consistent with an embodiment of the invention.

FIG. 5 shows an example of signal flow diagram illustrating signal processing operations performing deconvolution using Fast Fourier Transform (FFT) techniques consistent with an embodiment of the invention. Initially, the super-sampled receive signals can be transformed using an FFT (S502). The FFT'd received signals then undergo a thresholding operation which effectively acts as a low pass filter to reduce noise (S504). During the threshold operation S504, the magnitude of the frequency components can be set to zero if they fall under a predetermined value. The predetermined value can be empirically determined, and, for example, could be set at 0.1% of the peak value of the spatial profile of the target. High frequency components, along with noise, typically have low magnitudes and are more likely to be zeroed out, thus the operation has similar, but not identical, results as a low pass filter. The FFT of the transmit waveform can also performed (S506). This operation is typically is only performed once as the transmit waveforms are usually substantially identical for each PRF cycle, but may be repeated for each pulse if the transmit waveform has pulse-to-pulse variations. Next, the FFT of the received signals can be point-by-point divided by the FFT of the transmit waveform (S508). This quotient can then inverse FFT'd to produce the spatial profile (S510). Once the spatial profile is obtained, the radial extent can be determined (S512), either using one spatial profile, or using combined spatial profiles obtained from multiple pulse pairs, by peak detection. Any form of peak detection known to one of ordinary skill in the art can be used. The locations (typically an array index) corresponding to the peaks can be determined. The locations corresponding to the extents of the target can be chosen and simply subtracted. This difference can then be scaled to convert it to a radial extent having physical units. The conversion can be a simple scale factor, which can be derived from the radar collection parameters and the super-sampling oversample factor.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for determining a radial extent of a target using radar signals, comprising:
   super-sampling a radar transmit waveform to generate a digitized transmit waveform;
   super-sampling received radar signals to generate a digitized receive signal;
   reducing noise present in the digitized receive signal;
   deconvolving the noise reduced digitized receive signal and the digitized transmit waveform to compute a spatial profile; and
   generating the target radial extent using the spatial profile.

2. The method according to claim 1, wherein the reducing noise and deconvolving further comprises:
   transforming the digitized transmit waveform;
   transforming the digitized receive signal;
   thresholding the transformed digitized receive signal;
   dividing the noise reduced, transformed digitized receive signal by the transformed digitized transmit waveform; and
   inverse transforming the divided signal.

3. The method according to claim 2, wherein the transforming further comprises a Fast-Fourier Transform, and wherein the inverse transforming further comprises an inverse Fast Fourier Transform.

4. The method according to claim 1, wherein the noise reduction further comprises finite impulse response filtering, infinite impulse response filtering, statistical filtering, or non-linear filtering.

5. The method according to claim 1, wherein the generating further comprises:
   detecting peaks within the spatial profile;
   determining the location of each peak;
   selecting locations corresponding to the extent of the target;
   converting the selected locations into a radial extent value.

6. The method according to claim 1, wherein the super-sampling further comprises: sampling a signal using a sampling frequency with is at least an order of magnitude times a bandwidth of the signal.

7. The method according to claim 6, wherein the sampling frequency is 20 times the bandwidth of the signal.

8. The method according to claim 1, further comprising;
   determining whether another received radar signal should be processed;
   repeating the super-sampling of the received radar signals, the reducing, and the deconvolving, to produce a plurality of spatial profiles;
   combining the plurality of spatial profiles to reduce noise; and
   generating the target radial extent using the combined spatial profile.

9. The method according to claim 8, wherein the combining further comprises averaging the plurality of spatial profiles.

10. An apparatus for determining a radial extent of a target using radar signals, comprising:
    an analog-to-digital converter (A/D) which performs super-sampling;
    at least one processor functionally coupled to the A/D; and
    memory functionally coupled to the processor, which stores a super-sampled digitized transmit waveform and a super-sampled digitized receive signal, and further stores instructions causing the processor to
      reduce noise present in the digitized receive signal;
      deconvolve the digitized receive signal and the digitized transmit waveform to compute a spatial profile, and
      generate the target radial extent using the spatial profile.

11. The apparatus according to claim 10, wherein the stored instructions further cause the processor to
    transform the digitized transmit waveform,
    transform the digitized receive signal,
    threshold the transformed digitized receive signal,
    divide the noise reduced, transformed digitized receive signal by transformed digitized transmit waveform, and
    inverse transform the divided signal.

12. The apparatus according to claim 11, wherein the transform further comprises a Fast-Fourier Transform, and wherein the inverse transform further comprises an inverse Fast Fourier Transform.

13. The apparatus according to claim 10, wherein the stored instructions further cause the processor to filter the digitized receive signal using a finite impulse response filter, an infinite impulse response filter, a statistical filter, or a non-linear filter.

14. The apparatus according to claim 10, wherein the stored instructions further cause the processor to
    detect peaks within the spatial profile,
    determine the location of each peak,
    select locations corresponding to the extents of the target, and
    convert the selected locations into a radial extent value.

15. The apparatus according to claim 10, wherein the super-sampling samples a signal using a sampling frequency with is at least an order of magnitude times a bandwidth of the signal.

16. The apparatus according to claim 10, wherein the stored instructions further cause the processor to
    determine whether more received radar signals should be processed,
    repeat the noise reduction and the deconvolving using a plurality of super-sampled digitized receive signals, to produce a plurality of spatial profiles, and
    combine the plurality of spatial profiles to reduce noise, and
    generate the target radial extent using the combined spatial profile.

17. A method for determining a radial extent of an target using an active sensor, comprising:
    performing noise reduction on a digitized received signal;
    deconvolving the noise reduced received signal by a transmit waveform to produce a spatial profile, wherein both the noise reduced received signal and the transmit waveform are over-sampled; and
    determining the target radial extent using the spatial profile.

18. The method according to claim 17, wherein the performing noise reduction and deconvolving further comprises:
    transforming the digitized transmit waveform;
    transforming the digitized receive signal;
    thresholding the transformed digitized receive signal;
    dividing the noise reduced, transformed digitized receive signal by the transformed digitized transmit waveform; and
    inverse transforming the divided signal.

19. The method according to claim 18, wherein the transforming further comprises a Fast-Fourier Transform, and wherein the inverse transforming further comprises an inverse Fast Fourier Transform.

20. The method according to claim 17, wherein the noise reduction further comprises finite impulse response filtering, infinite impulse response filtering, statistical filtering, or non-linear filtering.

21. The method according to claim 17, wherein the generating further comprises:
    detecting peaks within the spatial profile;
    determining the location of each peak;
    selecting locations corresponding to the extents of the target;
    converting the selected locations into a radial extent value.

22. The method according to claim 17, further comprising: sampling received signals and a transmit waveform using a sampling frequency which is at least an order of magnitude times a bandwidth of the transmit waveform and a bandwidth of received signals.

* * * * *